Dec. 4, 1951
S. J. CARNES
2,577,229
AUDIBLE FISH LURE
Filed Aug. 20, 1949
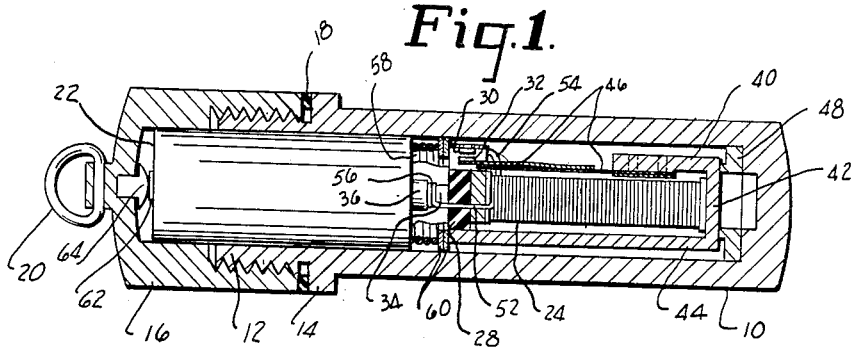
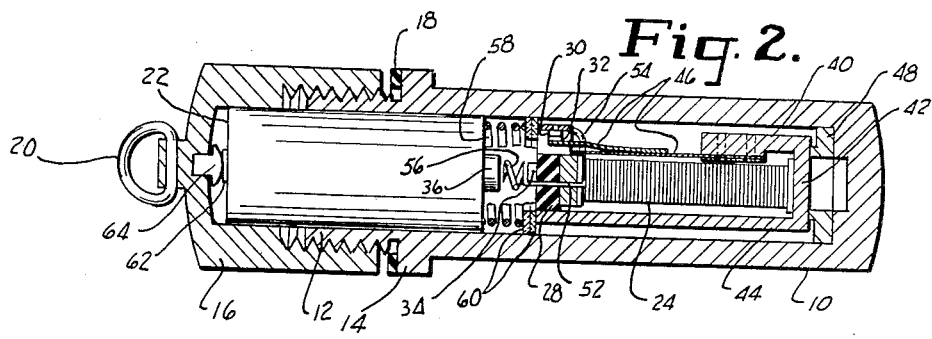
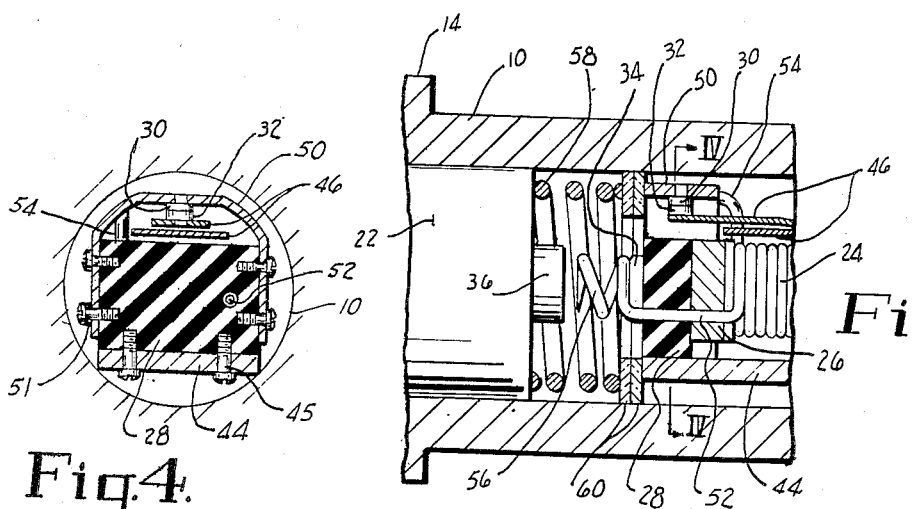
INVENTOR.
Samuel J. Carnes
BY
Louis Necho
Attorney Patented Dec. 4, 1951

2,577,229

UNITED STATES PATENT OFFICE 2,577,229

AUDIBLE FISH LURE

Samuel J. Carnes, Camden, Ark.

Application August 20, 1949, Serial No. 111,415

1 Claim. (Cl. 177—7)

My invention relates to an audible fish lure adapted to produce a sound simulating the sound produced by insects on which the fish feed so as to attract the fish to the vicinity of the baited hook.

One object of the invention is to produce an improved lure of the type set forth.

A further object is to produce a durable and inexpensive audible lure and one which can be easily operated.

A still further object is to produce an audible lure which operates on a standard, conventional dry cell battery so that it can be kept in operation by merely replacing exhausted batteries by fresh ones.

These and other objects are attained by my invention as set forth in the following specification and illustrated in the accompanying drawing in which:

Fig. 1 is a longitudinal sectional view showing the lure in its activated, or sound producing, condition.

Fig. 2 is similar to Fig. 1 but showing the lure in its de-activated condition.

Fig. 3 is an enlarged fragmentary, longitudinal, sectional view showing details of structure.

Fig. 4 is a section on line IV—IV of Fig. 3.

The lure shown includes a metallic casing 10 having an externally threaded neck 12 and a flange or shoulder 14 against which the end of an internally threaded metallic cap 16 engaging the neck 12 is adapted to abut. To make a water tight connection a washer 18 is placed on the shoulder 14. The cap is provided with a ring 20 to which a string can be tied to lower into the water.

The sound making mechanism includes a high frequency buzzer or vibrator and a dry cell battery 22 for energizing the buzzer. The buzzer includes a solenoid 24, a magnetizable block 26, an insulating block 28, a fixed contact 30, a movable contact 32 adapted to coact to produce the desired sound and a contact 34 adapted to engage a contact 36 on one side of the battery 22. The solenoid and its adjuncts is carried by a U-shaped strap having a relatively short limb 40, a bight portion 42 and a relatively long limb 44 which is secured to the insulating block 28 as at 45. The short limb 40 of the U-shaped strap has secured to it a forked spring arm 46 which carries the movable contact 32 and a block 48, formed of a good electric conductor, is interposed between the bight portion of the U-shaped strap and the bottom of the casing to establish current flow between the solenoid and the casing. The fixed contact 30 is carried by a strap 50 which is secured, at 51, to the insulating block 28. A wire 52 connects the fixed contact 30 to the solenoid and a wire 54 connects the movable contact 32 to the solenoid. In order to insure adequate engagement of the battery contact 36 with the solenoid contact 34, a conducing spring 56 is connected to and extends upwardly from contact 34 toward contact 36. A large spring 58, seated on insulating washers 60, is interposed between the battery and the solenoid to prevent the completion of the electric current except when the cap 16 is closed tight as in Fig. 1. In order to insure completion of the circuit when the cap 16 is threaded home, a contact 62 is provided in the interior of the cap 16 for engaging contact 64 at the adjacent end of the battery.

With the parts assembled as described, an electric circuit is established which includes contacts 30 and 32, and contacts 34 and 36 and which operates in the manner set forth on page 275 of Practical Physics, published in 1917, by MacMillan, New York, N. Y. Thus, when the cap is moved toward the casing 10 far enough to cause contact 36 to engage spring 56 and/or contact 34 the circuit through the battery and through the solenoid will be completed. This magnetizes block 52 which draws the movable contact 32 away from the fixed contact 30 and breaks the circuit. When the block 52 is demagnetized, the spring arm 46 again brings movable contact 32 into engagement with fixed contact 30 and the cycle of operation is repeated.

In practice, it is merely necessary for the fisherman to put the battery 22 in position and only partially thread the cap 16 onto the neck 12 of the casing. When the lure is to be used, the cap 16 is threaded home so as to cause contact 36 to engage contact 34 and so as to provide a water tight joint between it and the casing. As is well known, the buzz produced can be varied by varying the thickness, the length and the rate at which the vibrating member moves. By controlling these factors, a hum simulating that of an insect is produced so as to attract the fish to the baited hook.

What I claim:

An audible fish lure including a receptacle having an open end and a threaded portion near said open end, a cap having a threaded portion adapted to engage the threaded portion of the receptacle to form a closed casing, a solenoid, an insulating block carried by the upper end of said solenoid, a first fixed contact carried by said block, a movable contact carried by said solenoid, means urging said movable contact into engagement with said first fixed contact, a second fixed contact also carried by said solenoid, means establishing electrical conduction between the solenoid and the casing, said cap and the portion of the receptacle above the solenoid coacting to form an adjustable compartment for housing a battery, a third contact on said cap for engaging one terminal of the battery, and a spring between the juxtaposed ends of the solenoid and the battery for preventing the other terminal of the battery from engaging said second fixed contact, the threaded portions of the cap and the receptacle being such that, when the cap is threaded tightly against the receptacle, said spring is compressed sufficiently to cause said second fixed contact to be engaged by said other terminal of the battery.

SAMUEL J. CARNES.

REFERENCES CITED

The following references are of record in the file of this patent:

UNITED STATES PATENTS

| Number | Name | Date |
|---|---|---|
| 963,238 | McElroy | July 5, 1910 |
| 1,194,018 | Hartner | Aug. 8, 1916 |
| 2,354,699 | Owens | Aug. 1, 1944 |